(12) United States Patent
Waters (10) Patent No.: US 7,902,698 B1
(45) Date of Patent: Mar. 8, 2011

(54) METHOD OF FABRICATING A MICRO-ELECTRO-MECHANICAL APPARATUS FOR GENERATING POWER RESPONSIVE TO MECHANICAL VIBRATION

(75) Inventor: Richard L. Waters, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 789 days.

(21) Appl. No.: 11/936,858

(22) Filed: Nov. 8, 2007

Related U.S. Application Data (62) Division of application No. 10/911,748, filed on Jul. 28, 2004, now Pat. No. 7,501,726.

(51) Int. Cl.
*H02K 33/00* (2006.01)
(52) U.S. Cl. .............................. 310/36; 29/596
(58) Field of Classification Search ............. 29/596; 310/40 MM, 36
See application file for complete search history.

(56) References Cited

U.S. PATENT DOCUMENTS

| | | | |
|---|---|---|---|
| 5,189,323 A * | 2/1993 | Carr et al. ............ | 310/40 MM |
| 5,685,062 A | 11/1997 | McCarthy et al. | |
| 5,818,132 A | 10/1998 | Konotchick | |
| 6,127,812 A | 10/2000 | Ghezzo et al. | |
| 6,392,313 B1 | 5/2002 | Epstein et al. | |
| 6,519,075 B2 | 2/2003 | Carr et al. | |
| 6,722,206 B2 | 4/2004 | Takeda | |
| 6,770,997 B2 * | 8/2004 | Koeneman ............ | 310/178 |
| 7,152,300 B1 * | 12/2006 | Suzuki ............ | 29/596 |
| 7,239,054 B2 * | 7/2007 | Takada et al. ............ | 310/40 MM |
| 7,501,726 B1 * | 3/2009 | Waters et al. ............ | 310/36 |
| 7,692,340 B2 * | 4/2010 | Waters et al. ............ | 310/36 |

OTHER PUBLICATIONS

C.B. Williams et al., "Analysis of a microelectric generator for microsystems," 8th Intl. Conf. Solid-State Sens. & Actuators, Stockholm, Sweden, Jun. 25-29, 1995, 87-B4, pp. 369-372.
Scott Meninger et al., "Vibration-to-Electric Energy Conversion," IEEE Trans. on VLSI Systems vol. 9, No. 1, pp. 64-76, Feb. 2001.
Neil Ching et al. "A laser-micromachined multi-modal resonating power transducer for wireless sensing systems," Sensors and Actuators A: Physical, vol. 97-98, pp. 685-690, 2002.
C.B. Williams et al., "Development of an electromagnetic microgenerator," IEEE Proc.—Circuits Devices Syst., vol. 148, No. 6, pp. 337-342, Dec. 2001.
Li et al., "IR Signal Transmissiion by a Laser-Micromachined Vibration-Induced Power Generator," Proc. 43rd IEEE Midwest Symp. on Circ. & Syst., Lansing MI, Aug. 8-11, 2000, pp. 236-239.

* cited by examiner

*Primary Examiner* — Nguyen N Hanh
(74) *Attorney, Agent, or Firm* — Kyle Eppele; J. Eric Anderson (57) ABSTRACT

A method for fabricating a monolithic micro-generator comprising: fabricating a plurality of magnet layer elements by preparing a semiconductor substrate surface to define: a plurality of coil layer recesses, a plurality of magnet wells, a plurality of integral compliant regions, and a plurality of bonding posts; disposing a ferromagnetic mass within each of a plurality of the magnet wells; fabricating a coil layer element by preparing a second semiconductor substrate surface to define a coil well, and one or more through holes, each hole disposed to accept a bonding post; disposing a conductive coil within the coil well; and bonding the upper bonding post surfaces of a magnet layer element to the corresponding upper bonding post surfaces of another magnet layer element with a coil layer element disposed between their upper surfaces such that each of the bonding posts passes through a corresponding through hole in the coil layer element.

5 Claims, 5 Drawing Sheets

METHOD OF FABRICATING A MICRO-ELECTRO-MECHANICAL APPARATUS FOR GENERATING POWER RESPONSIVE TO MECHANICAL VIBRATION

CROSS-REFERENCE TO RELATED APPLICATION

This application is a divisional application of U.S. patent application Ser. No. 10/911,748, filed 28 Jul. 2004 now U.S. Pat. No. 7,501,726, titled "Micro-Electro-Mechanical System (MEMS) and Apparatus for Generating Power Responsive to Mechanical Vibration," which is incorporated herein by this reference.

STATEMENT OF GOVERNMENT INTEREST

The invention described herein may be manufactured and used by or for the Government of the United States of America for Governmental purpose without the payment of any royalties thereon or therefore.

FEDERALLY-SPONSORED RESEARCH AND DEVELOPMENT

This application is assigned to the United States Government and is available for licensing for commercial purposes. No license is necessary when used for Governmental purposes. Licensing and technical inquiries should be directed to the Office of Patent Counsel, Space and Naval Warfare Systems Center, San Diego, Code 20012, San Diego, Calif., 92152; telephone (619)553-3001, facsimile (619)553-3821. Reference Navy Case #98745.

BACKGROUND OF THE INVENTION

There is a growing interest in the field of miniature sensors in applications such as medical implants and embedded sensors in buildings. One of the projected goals for micro-electro-mechanical systems (MEMS) technology is to develop low-cost and high-performance distributed sensor systems for medical, automotive, manufacturing, robotics, and household applications. One area that has received little attention is how to effectively supply the required electrical power to such sensor elements. Many applications require the sensors to be completely embedded in a structure with no physical connection to the outside world. Ideally, the elements of these distributed systems have their own integrated power supplies to reduce problems related to interconnection, electronic noise and control system complexity. Efforts are underway to develop integrated chemically-based power supplies with MEMS devices. Chemical power supply (battery) technology is well-developed for such applications but, where shelf life or replacement accessibility is a limiting factor, chemical power supplies may not be suitable for the application. Another approach to supplying power to such systems is to include a renewable power supply within the sensor element, thereby making them self-powered microsystems.

Renewable power supplies convert energy harvested from an existing energy source within the environment into electrical energy. The preferred source of energy depends on the application. Some possible energy sources include optical energy from ambient light such as sunlight, thermal energy harvested across a temperature gradient, volume flow energy harvested across a liquid or gas pressure gradient, and mechanical energy harvested from motion and vibration. Of these sources, light and thermal energy have already been exploited for use in micro-power supplies. However, there are many applications where there is an insufficient amount of light or thermal energy such as in medical implants. Therefore, practitioners in the art have proposed many different power supplies that generate electricity from ambient mechanical energy. Ambient mechanical vibrations inherent in the environment, from the movement of our bodies to the hum of a computer, can provide a constant power density of 10 to 50 µW/cc.

Several practitioners have proposed rudimentary vibration-based power generators at the University of Sheffield [C. B. Williams, R. B. Yates, "Analysis of a microelectric generator for microsystems," 8th Intl. Conf. on Solid-State Sens. & Actuators, Stockholm, Sweden, 25-29 Jun. 1995, 87-B4, pp. 369-72] and Massachusetts Institute of Technology [Scott Meninger, Jose Oscar Mur-Miranda, Rajeevan Amirtharajah, Anantha P. Chandrakasan, and Jeffrey H. Lang, "Vibration-to-Electric Energy Conversion," IEEE Trans. on VLSI Systems Vol. 9, No. 1, pp. 64-76, February 2001] for example. Meninger, et al. describe a micro-generator that harvests vibrational energy by accumulating the voltage created by vibration-induced changes in a variable capacitor.

Others have recently improved on the earlier efforts. For example, Ching et al. [Neil N. H. Ching, H. Y Wong, Wen J. Li, Philip H. W. Leong, and Zhiyu Wen, "A laser-micromachined multi-modal resonating power transducer for wireless sensing systems," Sensors and Actuators A: Physical, Vol. 97-98, pp. 685-690, 2002.] describe a micromachined generator with enough power to drive an off-the-shelf circuit. For this work, Ching et al. prefer micromachining methods to build their vibration-induced power generator because the methods afford precise control of the mechanical resonance necessary for generator efficiency, and batch fabricability for low-cost mass production of commercially viable generators. Similarly, Williams et al. later describe [C. B. Williams, C. Shearwood, M. A. Harradine, P. H. Mellor, T. S. Birch and R. B. Yates, "Development of an electromagnetic micro-generator," IEE Proc.—Circuits Devices Syst., Vol. 148, No. 6, pp. 337-342, December 2001.] a simple inertial generator built according to their earlier theoretical analysis that is also fabricated by means of micromachining. Other examples include the laser-micromachined electromagnetic generator described by Li et al. [Wen J. Li, Terry C. H. Ho, Gordon M. H. Chan, Philip H. W. Leong and Hui Yung Wong, "Infrared Signal Transmission by a Laser-Micromachined Vibration-Induced Power Generator," Proc. $43_{rd}$ IEEE Midwest Symp. on Circuits and Systems, Lansing Mich., 08-11 Aug. 2000, pp 236-9], which provides 2VDC power sufficient to send 140 ms pulse trains every minute when subjected to 250 micron vibrations in the 64-120 Hz region.

In U.S. Pat. No. 6,127,812, Ghezzo et al. describe an energy extractor includes a capacitor that experiences capacitance and voltage changes in response to movement of a capacitor plate or of a dielectric material. In one embodiment, a third plate is positioned between first and second plates to create two capacitors of varying capacitances. In another embodiment, one capacitor plate is attached by flexible arms which permit movement across another capacitor plate. The above capacitors can be used singularly or with one or more other capacitors and are rectified either individually or in a cascaded arrangement for supplying power to a rechargeable energy source. The above capacitors can be fabricated on a substrate along with supporting electronics such as diodes. Ghezzo et al. employ varying capacitance and neither considers nor suggests any solution the problem of fabricating an electromagnetic micro-generator.

In U.S. Pat. No. 6,722,206 B2, Takeda describes a force sensing device having an element of magnetic material mounted to a substrate such that another magneto-electrical material element is subjected to the magnetic field generated by the magnetic member. A movable member is mounted for oscillation in response to vibration and such oscillation changes the magnetic field experienced by the magneto-electrical material, which in turn changes an electrical property of the magneto-electrical material. Takeda neither considers nor suggests any solution to the problem of fabricating an electromagnetic micro-generator.

Despite the efforts of several practitioners in the art, there still exists a need in the art for an electromagnetic micro-generator suitable for inexpensive fabrication in volume at the MEMS scale that can generate power sufficient for operating today's microchips. The electromagnetic devices known in the art all generally employ a single magnetic mass which oscillates on a spring element to change the magnetic flux at a nearby stationary coil. These devices are thereby limited in power output capacity by the limited mass of the single magnet, the limited room for a number of coils in the flux field of the single magnet and the limited flux slope available at the coils because of the single magnetic pole exposed thereto. These unresolved problems and deficiencies are clearly felt in the art and are solved by this invention in the manner described below.

SUMMARY OF THE INVENTION

This invention solves these problems by introducing for the first time a micro-electro-mechanical system (MEMS) power generator employing a plurality of magnetic masses disposed to oscillate on spring elements in a manner that produces an unusually steep flux gradient at one or more conductive coils, thereby harvesting a substantial portion of the available mechanical energy.

It is a purpose of this invention to harvest the energy from ambient mechanical vibration to produce electrical power sufficient to power individual electronic elements for a variety of low-cost and high-performance distributed sensor systems for medical, automotive, manufacturing, robotics, and household applications In one aspect, the invention is a monolithic micro-generator including a substrate having a plurality of integral compliant regions, at least two ferromagnetic masses each coupled to a corresponding one or more of the integral compliant regions such that at least one of the two ferromagnetic masses moves with respect to the substrate responsive to substrate acceleration, each ferromagnetic mass having an inner magnetic pole disposed such that the two inner magnetic poles are separated from one another by a flux gap, a coil coupled to the substrate and disposed within the flux gap where it is exposed to a changing magnetic flux arising from motion of at least one of the two ferromagnetic masses with respect to the substrate, and conductors coupled to the coil for conducting electrical current flowing in response to the changing magnetic flux.

In another aspect, the invention is a MEMS power generator including a substrate having a plurality of integral compliant regions; a plurality of monolithic micro-generators each having at least two ferromagnetic masses each coupled to a corresponding one or more of the integral compliant regions such that at least one of the two ferromagnetic masses moves with respect to the substrate responsive to substrate acceleration, each ferromagnetic mass having an inner magnetic pole disposed such that the two inner magnetic poles are separated from one another by a flux gap, and a coil coupled to the substrate and disposed within the flux gap where it is exposed to a changing magnetic flux arising from motion of at least one of the two ferromagnetic masses with respect to the substrate; and conductors coupled to the plurality of micro-generator coils for conducting electrical current flowing in response to the magnetic flux changes.

In yet another aspect, the invention is a method for fabricating a monolithic micro-generator including the steps of (a) fabricating a plurality of magnet layer elements by performing the steps of (a.1) preparing a first semiconductor substrate having upper and lower surfaces, (a.2) masking and etching the first semiconductor upper substrate surface to define a plurality of coil layer recesses, (a.3) masking and etching the first semiconductor upper substrate surface to define a plurality of magnet wells, (a.4) masking and etching the first semiconductor upper substrate surface to define a plurality of integral compliant regions, (a.5) masking and etching the first semiconductor upper substrate surface to define a plurality of bonding posts each having an upper surface, and (a.6) disposing a ferromagnetic mass within each of a plurality of the magnet wells; (b) fabricating a coil layer element by performing the steps of (b.1) preparing a second semiconductor substrate having upper and lower surfaces, (b.2) masking and etching the second semiconductor upper substrate surface to define a coil well, (b.3) disposing a conductive coil within the coil well, and (b.4) masking and etching the second semiconductor upper substrate surface to define one or more through holes each disposed to accept a bonding post; and (c) bonding the upper bonding post surfaces of a first magnet layer element to the corresponding upper bonding post surfaces of a second magnet layer element with a coil layer element disposed between the upper surfaces of the first and second magnet layer elements such that each of the one or more bonding posts passes through a corresponding through hole in the coil layer element.

The foregoing, together with other objects, features and advantages of this invention, can be better appreciated with reference to the following specification, claims and the accompanying drawing.

BRIEF DESCRIPTION OF THE DRAWINGS

For a more complete understanding of this invention, reference is now made to the following detailed description of the embodiments as illustrated in the accompanying drawing, in which like reference designations represent like features throughout the several views and wherein:

FIG. 6, comprising FIGS. 6(a)-(d), is a diagram illustrating an edge view of an exemplary magnet layer fabrication process of this invention;

FIG. 7, comprising FIGS. 7(a)-(e), is a diagram illustrating an edge view of an exemplary magnet layer fabrication process of this invention;

FIG. 9, comprising FIGS. 9(a)-(d), is a diagram illustrating an edge view of an exemplary coil layer fabrication process of this invention;

FIG. 11, comprising FIGS. 11(a)-(c), is a diagram illustrating an edge view of a first exemplary micro-generator fabrication process of this invention using the magnet layer embodiment of FIG. 6; and FIG. 12, comprising FIGS. 12(a)-(b), is a diagram illustrating an edge view of a second exemplary micro-generator fabrication process of this invention using the magnet layer embodiment of FIG. 7.

DESCRIPTION OF THE PREFERRED EMBODIMENT

Figure 1:
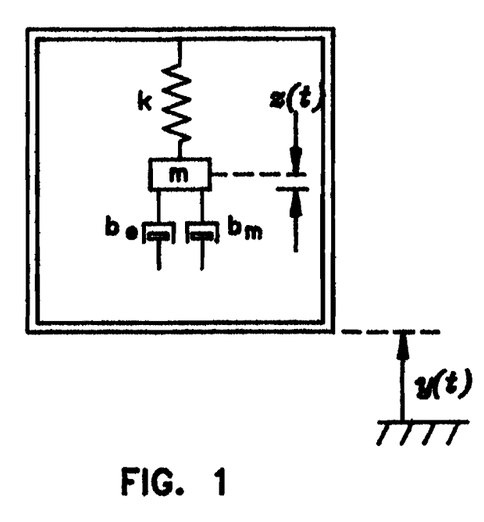
FIG. 1 is a schematic diagram illustrating a damped mass-spring model representative of the micro-generator system of this invention.

FIG. 1 is a schematic diagram illustrating a damped mass-spring model representative of the micro-generator system of this invention. Both electrical and mechanical damping must be considered in analyzing and optimizing the design for particular ambient vibration spectra. Referring to FIG. 1, for time t, a mass m, a spring constant k, an electrical damping factor $b_e$, a mechanical damping factor $b_m$, and a displacement function z(t), the power P available from the coil current may be expressed as shown in Eqn. 1:

$$P = \int_0^v F\,dv = \int_0^v b_e \dot{z}\,dv = b_e \int_0^v v\,dv = \frac{1}{2}b_e v^2 = \frac{1}{2}b_e \dot{z}^2 \quad \text{[Eqn. 1]}$$

Conservation of energy leads to Eqn. 2:

$$m\ddot{z} + (b_e + b_m)\dot{z} + kz = -m\ddot{y} \quad \text{[Eqn. 2]}$$

Laplacian transformation and the substitution of variables can be shown to provide the following Eqns. 3-10:

$$Z = \frac{-ms^2 Y}{ms^2 + (b_e + b_m)s + k} \quad \text{Let:} \quad \text{[Eqn. 3]}$$

$$b_e = 2m\xi_e \omega_n$$
$$b_m = 2m\xi_m \omega_n$$
$$\text{where } \omega_n^2 = k/m. \quad \text{[Eqns. 4]}$$

Thus, $|\dot{Z}| = \dfrac{-j\omega\left(\dfrac{\omega}{\omega_n^2}\right)}{2(\xi_e + \xi_n)\dfrac{j\omega}{\omega_n} + 1 - \left(\dfrac{\omega}{\omega_n}\right)^2}|Y|$ and [Eqn. 5]

$$|P| = \frac{m\xi_e \omega_n \omega^2 \left(\dfrac{\omega}{\omega_n}\right)^3 Y^2}{\left[\left(2(\xi_e + \xi_m)\dfrac{\omega}{\omega_n}\right) + \left(1 - \left(\dfrac{\omega}{\omega_n}\right)^2\right)\right]^2} \text{ or} \quad \text{[Eqn. 6]}$$

$$|P| = \frac{m\xi_e \omega^3 Y^2}{4(\xi_e + \xi_m)^2} = \frac{m\xi_e A^2}{4\omega(\xi_e + \xi_m)^2} \text{ where } A = \omega^2 Y. \quad \text{[Eqn. 7]}$$

This is a non-linear problem and, because of the nonlinear nature of the reaction force from the coil current, the system resonance may be optimized with reference to Eqn. 7 for a given application without undue experimentation. In general, the inventors have discovered that a higher electrical damping $b_e$ improves power output performance at frequencies below the mechanical resonant frequency $f_r=2\pi\omega_n$ of the system.

Figure 2:
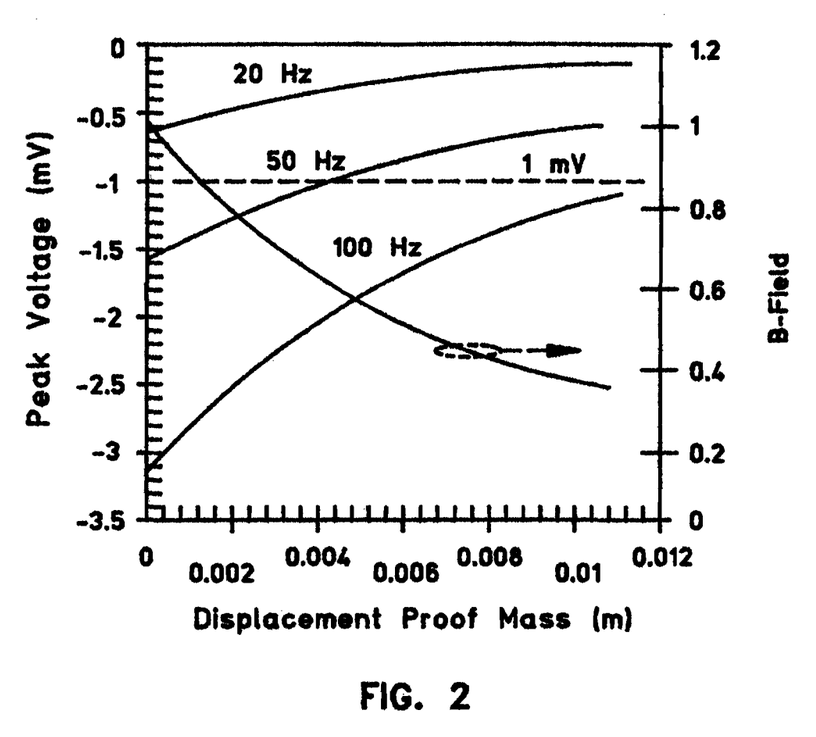
FIG. 2 is a chart illustrating the theoretical relationship between coil voltage, flux density and relative displacement according to classical electromagnetic theory for the model of FIG. 1.

FIG. 2 is a chart illustrating the expected coil voltage, flux density and relative displacement for various electrical and mechanical assumptions. The acceleration is assumed to be a constant 1.0 m/sec$^2$ over the entire frequency range, $B_{max}=1$ Tesla, k=1 N/m, velocity=50 mm/sec, mass=1 mg, and x=1 mm. The inventors have conducted both experimental and theoretical tests and have found that the predictions disclosed in FIG. 2 agree well with experimental measurements implemented on a larger physical scale.

A macro-scale version of the energy harvesting device was fabricated to verify the expected voltage output per coil. The experimental setup consisted of a one Tesla magnet measuring one inch in diameter and 3/16 inches in thickness. It was attached to a spring with sufficient spring force to result in a displacement of 2.5 mm under accelerations of 1.0 m/s$^2$ at a frequency of 20 Hz. The number of turns in the coil was varied sequentially from 5 to 40 in increments of 5 and voltage output measurements were made for each configuration. It was observed that the voltage generated per turn of the coil was very close to the expected value of 1 mV/turn using the simple one-dimensional (1-D) model described above.

A detailed analysis was performed by modeling the magnetic flux density in two dimensions and summing the total flux density normal to the surface of the coil. The input was once again assumed to be a 20 Hz sinusoidal input at 1.0 m/s$^2$. At each time step, the velocity, displacement from the coil to the magnet and total magnetic flux density normal to the surface were calculated. The results of this detailed analysis confirmed the simple 1-D calculations and the macro-scale experimental observations of 1 mV/turn.

Figure 3:
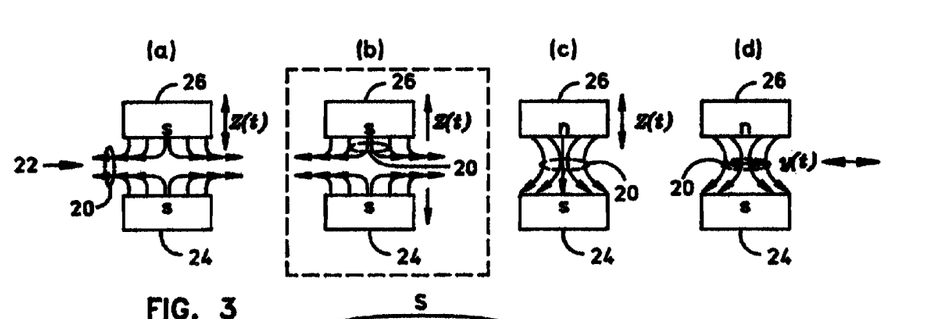
FIG. 3 is a diagram illustrating an edge view of several different coil/flux configurations available for use in the micro-generator system of this invention.

FIG. 3 is a diagram illustrating an edge view of several different coil/flux configurations. In FIG. 3, a coil 20 is disposed at a flux gap 22 formed by the two magnetic masses 24 and 26. In FIGS. 3(a) and 3(b), a "steep" flux gradient region is formed in flux gap 22 by virtue of the similar magnetic poles on each edge of flux gap 22. In FIGS. 3(c) and 3(d), a "shallow" flux gradient region is formed in flux gap 22 by virtue of the dissimilar magnetic poles on each edge of flux gap 22. In FIG. 3(a), coil 20 is disposed in flux gap 22 such that any vertical motion Z(t) of mass 26 with respect to mass 24 and coil 20 produces a rapid change in magnetic flux at coil 20. Similarly, in FIG. 3(b) coil 20 is disposed in flux gap 22 such that any synchronous vertical motion Z(t) of both masses 24-26 together with respect to coil 20 produces a rapid change in magnetic flux at coil 20. In contrast, in FIG. 3(c) coil 20 is disposed in flux gap 22 such that any vertical motion Z(t) of mass 26 with respect to mass 24 and coil 20 produces a limited change in magnetic flux at coil 20. Similarly, in FIG. 3(d) coil 20 is disposed in flux gap 22 such that any synchronous horizontal motion Y(t) of both masses 24-26 together with respect to coil 20 produces a limited change in magnetic flux at coil 20. Clearly, the coil/flux configurations illustrated in FIGS. 3(a) and 3(b) are preferred and, in particular, the configuration in FIG. 3(b) is preferred for implementation of the micro-generator of this invention. Moreover, additional magnetic masses may also be added and the present masses reorganized to form other useful geometric configurations are well-suited for implementation as alternative embodiments of the micro-generator of this invention.

Figure 4:
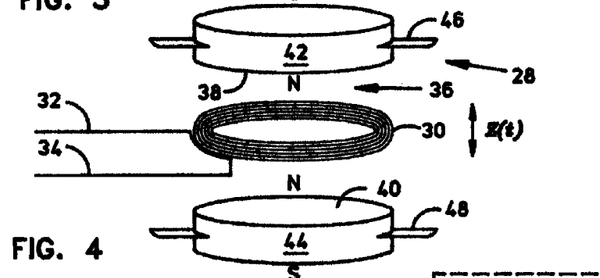
FIG. 4 is a diagram illustrating an edge perspective of an exemplary embodiment of the micro-generator of this invention.

FIG. 4 is a diagram illustrating an edge perspective of an exemplary embodiment 28 of the micro-generator of this invention. Micro-generator 28 includes a coil 30 consisting of a plurality of turns of electrically-conductive material coupled to the coil terminals 32 and 34. Coil 30 is disposed in the flux gap 36 bounded by the inner surfaces 38 and 40 of the magnetic masses 42 and 44, respectively. Inner surfaces 38 and 40 are shown as the N-poles of magnetic masses 42 and 44 but may be either polarity provided that both inner surfaces 38 and 40 have the same magnetic polarity. Magnetic mass 42 is supported by a plurality of compliant elements (springs) exemplified by the compliant element 46. Similarly, magnetic mass 44 is supported by a plurality of compliant elements exemplified by the compliant element 48. The free ends of compliant elements 46 and 48 are fixed in any useful manner (not shown) with respect to coil 30, thereby allowing magnetic masses 42 and 44 to move in the Z(t) direction with respect to coil 30 in response to external mechanical vibration.

Figure 5:
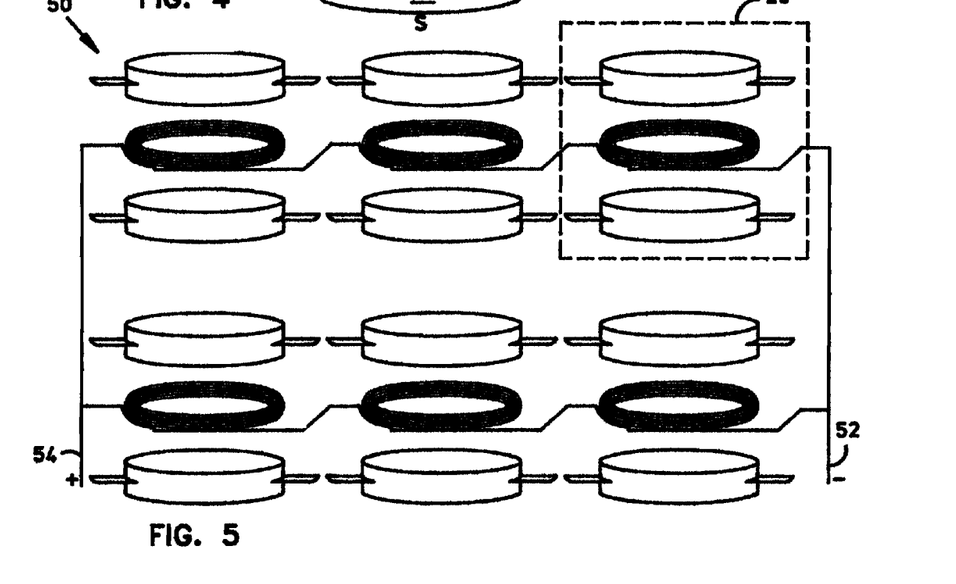
FIG. 5 is a diagram illustrating an edge perspective of an exemplary embodiment of the micro-electro-mechanical system (MEMS) power generator system of this invention.

FIG. 5 is a diagram illustrating an edge perspective of an exemplary embodiment 50 of the micro-electro-mechanical system (MEMS) power generator system of this invention. MEMS power generator 50 includes a plurality of the micro-generators of this invention, exemplified by micro-generator 28, with the individual coil terminals interconnected such that the electrical power generated by each micro-generator is aggregated at the MEMS power generator terminals 52 and 54. Preferably, the plurality of micro-generators composing MEMS generator 50 are coupled together for fixed exposure to the same ambient vibration.

Figure 6:
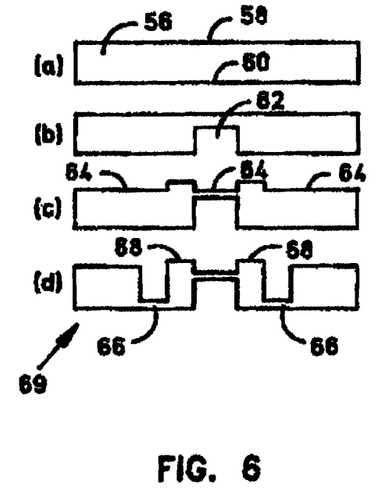
Figure 11:
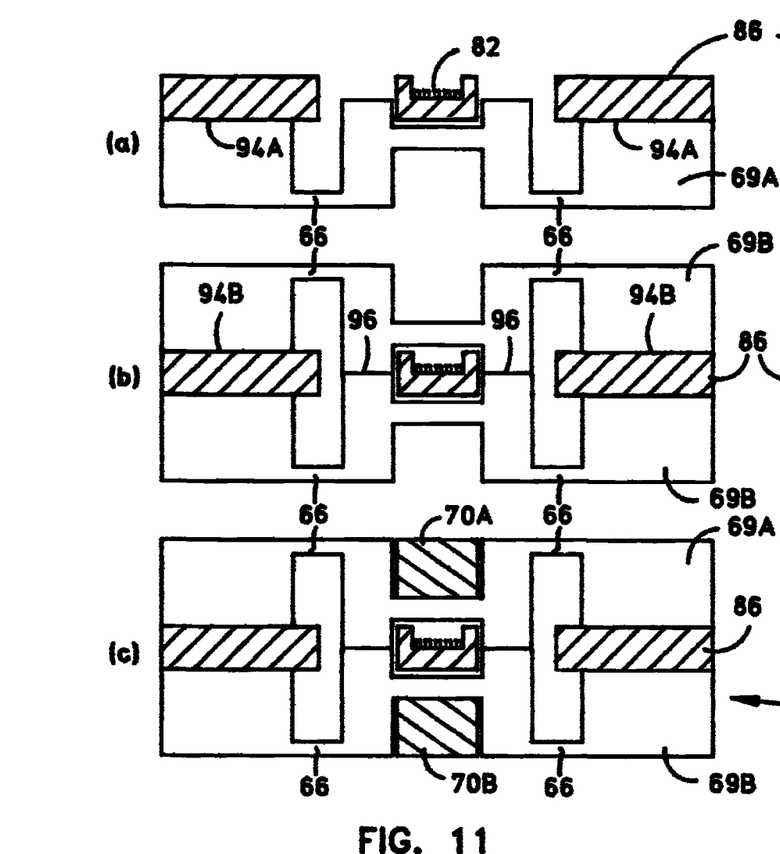

FIG. 6, comprising FIGS. 6(a)-(d), is a diagram illustrating an edge view of an exemplary magnet layer fabrication process of this invention. This process begins as shown in FIG. 6(a) with a semiconductor wafer 56. The material may be crystalline silicon or any other useful semiconductor material. Although the following discussion is limited to the preparation of a single magnet layer, practitioners in the art can readily appreciate that many such magnet layer elements may be simultaneously fabricated on a single semiconductor wafer in a single process and separated from the wafer in a wafer dicing process well known in the art. FIG. 6(a) illustrates the results of the first step in this process, which is the preparation of the upper surface 58 and the lower surface 60 for processing in the usual fashion by cleaning and polishing as necessary. FIG. 6(b) illustrates the results of the next step of this process, which is the masking and deep reactive ion etching (DRIB) of lower surface 60 to define the magnet well 62. FIG. 6(c) illustrates the results of the next step of this process, which is the masking and DRIB of upper surface 58 to define the coil layer recesses 64. FIG. 6(d) illustrates the results of the next two steps of this process, which is the masking and DRIB of upper surface 58 to define the integral compliant regions 66 and the bonding posts 68, thereby completing the magnet layer subelement 69 substantially as shown. Bonding posts 68 are also shown in FIG. 8 in a wafer facial view (magnet well 62 should be demarcated with hidden lines to illustrate the exemplary process of FIG. 6 and in solid lines for the exemplary process of FIG. 7). The final thickness of integral compliant regions 66 is established to provide the spring constant necessary for the desired resonant frequency of the final micro-generator (FIG. 11 below). The open region 71 in FIG. 8 is etched away completely to leave magnet well 62 coupled only by compliant regions 66. The final step of this magnet layer fabrication process is the disposition of a ferromagnetic mass 70 into magnet well 62 of magnet layer subelement 69 (shown in FIG. 11(c)), which may be accomplished immediately following the completion of magnet layer subelement 69 shown in FIG. 6(d) or, as illustrated herein, may be deferred until after the assembly of the micro-generator magnet layer and coil layer elements (FIG. 11).

Figure 7:
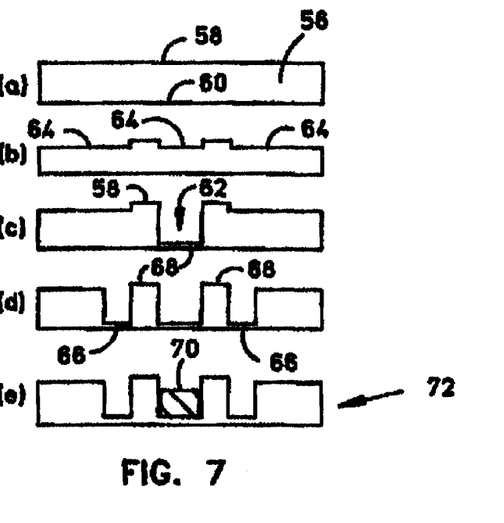
Figure 8:
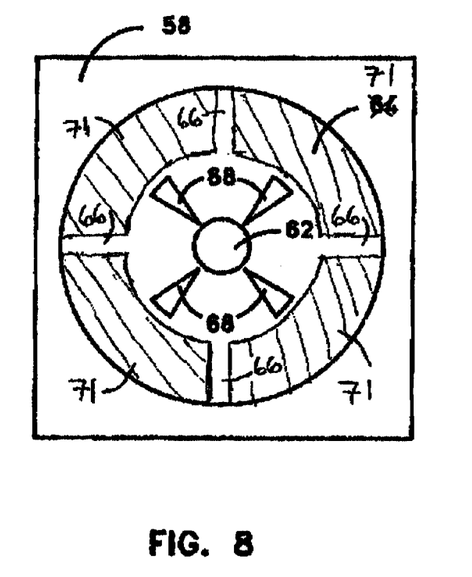
FIG. 8 is a diagram illustrating a facial view of the exemplary magnet layer embodiments of FIGS. 6 and 7.
Figure 12:
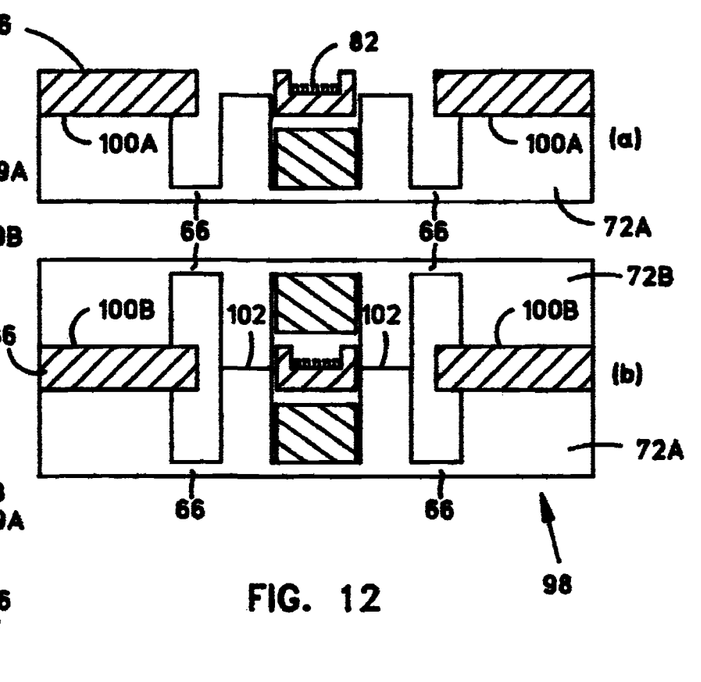

FIG. 7, comprising FIGS. 7(a)-(e), is a diagram illustrating an edge view of an alternative magnet layer fabrication process of this invention. This process also begins as shown in FIG. 7(a) with semiconductor wafer 56. FIG. 7(a) illustrates the results of the first step in this process, which is the preparation of upper surface 58 and lower surface 60 for processing in the usual fashion by cleaning and polishing as necessary. FIG. 7(b) illustrates the results of the next step of this process, which is the masking and DRIE of upper surface 58 to define the coil layer recesses 64. FIG. 7(c) illustrates the results of the next step of this process, which is the masking and DRIE of upper surface 58 to define the magnet well 62. FIG. 7(d) illustrates the results of the next two steps of this process, which is the masking and DRIE of upper surface 58 to define the integral compliant regions 66 and the bonding posts 68, which are also shown in FIG. 8 in a wafer facial view (magnet well 62 should be demarcated with hidden lines to illustrate the exemplary process of FIG. 6 and in solid lines for the exemplary process of FIG. 7). The final thickness of integral compliant regions 66 is established to provide the spring constant necessary for the desired resonant frequency of the final micro-generator (FIG. 12 below). The open region 71 in FIG. 8 is etched away completely to leave magnet well 62 coupled only by compliant regions 66. FIG. 7(e) illustrates the results of the final step of this process, which is the disposition of ferromagnetic mass 70 into magnet well 62. Ferromagnetic mass 70 should include a suitably "hard" ferromagnetic material, for example, sputtered CoPtCr having a 40 KOe field, and must be disposed with one magnetic pole bonded to the bottom of magnet well 62 and the other pole exposed at the top of mass 70, thereby completing the magnet layer element 72 substantially as shown.

Figure 9:
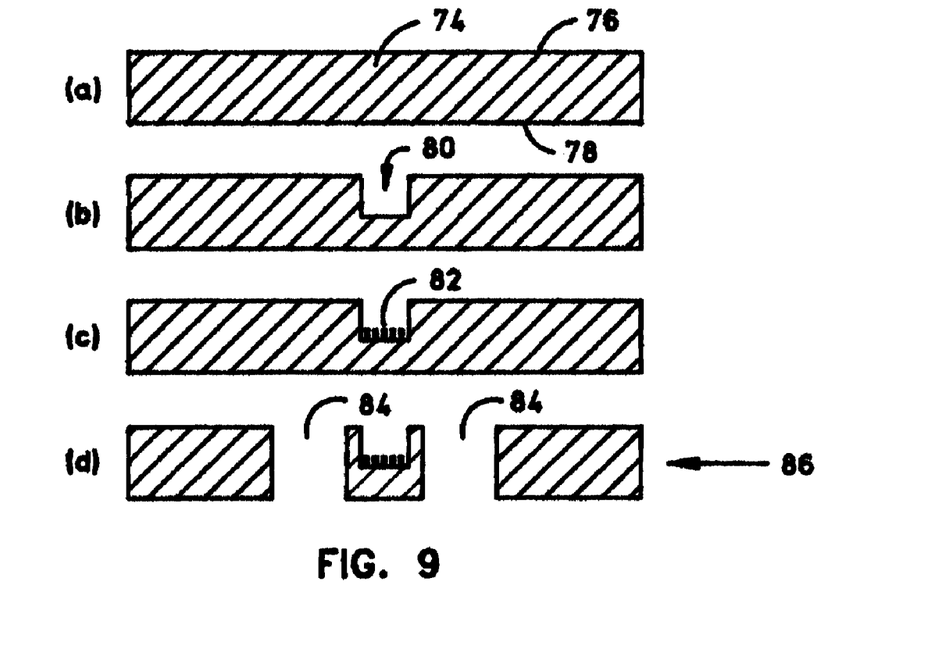
Figure 10:
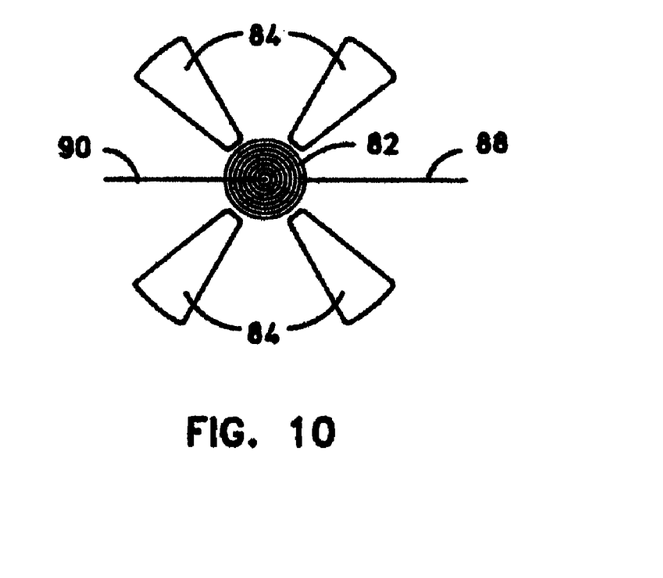
FIG. 10 is a diagram illustrating a facial view of the exemplary coil layer embodiment of FIG. 9.

FIG. 9, comprising FIGS. 9(a)-(d), is a diagram illustrating an edge view of an exemplary coil layer fabrication process of this invention. This process begins as shown in FIG. 9(a) with a semiconductor wafer 74. The material may be crystalline silicon or any other useful semiconductor material. Although the following discussion is limited to the preparation of a single coil layer, practitioners in the art can readily appreciate that many such coil elements may be simultaneously fabricated on a single semiconductor wafer in a single process and separated from the wafer in a wafer dicing process well known in the art. FIG. 9(a) illustrates the results of the first step in this process, which is the preparation of the upper surface 76 and the lower surface 78 for processing in the usual fashion by cleaning and polishing as necessary. FIG. 9(b) illustrates the results of the next step of this process, which is the masking and DRIE of upper surface 76 to define the coil well 80. FIG. 9(c) illustrates the results of the next step of this process, which is the disposition of a conductive coil 82 within coil well 80. The disposition of coil 82 may be accomplished using any of several useful techniques well known in the art, such as, for example, ion deposition of copper or aluminum conductors in a masked pattern, or by bonding a conductive layer (not shown) to the bottom of coil well 80 and masking and etching the conductive layer to create the desired coil geometry, for example. The coil may, for example, include 2,500 turns in a radius of 1 mm. FIG. 9(d) illustrates the results of the final step of this process, which is the masking and DRIE of either upper surface 76 or lower surface 78 to define the bonding post through holes 84, which are also shown in FIG. 10 in a wafer facial view, thereby completing the coil layer element 86 substantially as shown. FIG. 10 also illustrates the two conductive terminals 88 and 90 disposed to permit electrical connection to coil 82.

FIG. 11, comprising FIGS. 11(*a*)-(*c*), is a diagram illustrating an edge view of the fabrication of a first exemplary embodiment 92 of the micro-generator of this invention, which is shown in FIG. 11(*c*). FIG. 11(*a*) illustrates the results of the first step in this process, which is the bonding of a coil layer element 86 to a first magnet layer subelement 69A at the bonding surfaces 94A. FIG. 11(*b*) illustrates the results of the second step in this process, which is the bonding of a second magnet layer subelement 69B to coil layer element 86 at the bonding surfaces 94B and to first magnet layer subelement 69A at the bonding post surfaces 96. Note that sufficient clearance is provided to permit coil 82 to remain mechanically isolated from bonding post surfaces 96 except for the mechanical coupling provided by compliant regions 66. The final step of this micro-generator fabrication process is the disposition of ferromagnetic masses 70A and 70B into magnet well 62 of magnet layer subelements 69A and 69B, respectively, which may instead be accomplished immediately following the completion of magnet layer subelement 69 before beginning the assembly of micro-generator 92.

FIG. 12, comprising FIGS. 12(*a*)-(*b*), is a diagram illustrating an edge view of the fabrication of a second exemplary embodiment 98 of the micro-generator of this invention, which is shown in FIG. 12(*b*). FIG. 12(*a*) illustrates the results of the first step in this process, which is the bonding of a coil layer element 86 to a first magnet layer element 72A at the bonding surface 100A. FIG. 12(*b*) illustrates the results of the second step in this process, which is the bonding of a second magnet layer element 72B to coil layer element 86 at the bonding surfaces 100B and to first magnet layer element 72A at the bonding post surfaces 102. Note that sufficient clearance is provided to permit coil 82 to remain mechanically isolated from bonding post surfaces 102 except for the mechanical coupling provided by compliant regions 66.

Based on measurements and calculations, the inventors suggest that the MEMS power generator of this invention can provide an output power from 10 to 500 mW/cc at an output voltage from 100 mV to 5,000 mV.

Clearly, other embodiments and modifications of this invention may occur readily to those of ordinary skill in the art in view of these teachings. Therefore, this invention is to be limited only by the following claims, which include all such embodiments and modifications when viewed in conjunction with the above specification and accompanying drawing.

It will be understood that many additional changes in the details, materials, steps and arrangement of parts, which have been herein described and illustrated to explain the nature of the invention, may be made by those skilled in the art within the principal and scope of the invention as expressed in the appended claims.

I claim:

1. A method for fabricating a monolithic micro-generator comprising the unordered steps of:
   (a) fabricating a plurality of magnet layer elements by performing the unordered steps of:
      (a.1) preparing a first semiconductor substrate having upper and lower surfaces,
      (a.2) masking and etching the first semiconductor upper substrate surface to define a plurality of coil layer recesses,
      (a.3) masking and etching the first semiconductor upper substrate surface to define a plurality of magnet wells,
      (a.4) masking and etching the first semiconductor upper substrate surface to define a plurality of integral compliant regions,
      (a.5) masking and etching the first semiconductor upper substrate surface to define a plurality of bonding posts each having an upper surface, and
      (a.6) disposing a ferromagnetic mass within each of a plurality of the magnet wells;
   (b) fabricating a coil layer element by performing the unordered steps of:
      (b.1) preparing a second semiconductor substrate having upper and lower surfaces,
      (b.2) masking and etching the second semiconductor upper substrate surface to define a coil well,
      (b.3) disposing a conductive coil within the coil well, and
      (b.4) masking and etching the second semiconductor upper substrate surface to define one or more through holes each disposed to accept a bonding post; and
   (c) bonding the upper bonding post surfaces of a first magnet layer element to the corresponding upper bonding post surfaces of a second magnet layer element with a coil layer element disposed between the upper surfaces of the first and second magnet layer elements such that each of the one or more bonding posts passes through a corresponding through hole in the coil layer element.

2. The method of claim 1 further comprising the step of:
   (a.7) dicing the first semiconductor substrate to separate therefrom the plurality of magnet layer elements.

3. The method of claim 2 further comprising the step of:
   (b.5) dicing the second semiconductor wafer to separate therefrom a plurality of the coil layer elements.

4. The method of claim 3 wherein the masking and etching step (a.3) comprises the step of:
   (a.3) masking and etching the first semiconductor lower substrate surfaces to define a plurality of magnet wells.

5. The method of claim 2 wherein the masking and etching step (a.3) comprises the step of:
   (a.3) masking and etching the first semiconductor lower substrate surfaces to define a plurality of magnet wells.

* * * * *